United States Patent
Lin et al.

(10) Patent No.: US 11,719,458 B2
(45) Date of Patent: Aug. 8, 2023

(54) HVAC CONTROL FINE-GRAINED OCCUPANCY PATTERN ESTIMATION

(71) Applicant: Robert Bosch GmbH, Stuttgart (DE)

(72) Inventors: Shan Lin, Jericho, NY (US); Sirajum Munir, Pittsburgh, PA (US)

(73) Assignee: Robert Bosch GmbH, Stuttgart (DE)

(*) Notice: Subject to any disclaimer, the term of this patent is extended or adjusted under 35 U.S.C. 154(b) by 436 days.

(21) Appl. No.: 16/850,860

(22) Filed: Apr. 16, 2020

(65) Prior Publication Data
US 2021/0325072 A1    Oct. 21, 2021

(51) Int. Cl.
| F24F 11/65 | (2018.01) |
| F24F 11/48 | (2018.01) |
| F24F 11/47 | (2018.01) |
| G06N 3/08 | (2023.01) |

(52) U.S. Cl.
CPC ............... *F24F 11/65* (2018.01); *F24F 11/47* (2018.01); *F24F 11/48* (2018.01); *G06N 3/08* (2013.01)

(58) Field of Classification Search
CPC .. F24F 11/65; F24F 11/47; F24F 11/48; F24F 2110/10; F24F 2120/10; F24F 11/62; F24F 11/46; F24F 11/56; F24F 11/64; F24F 11/70; F24F 11/88; G06N 3/08; G06N 3/0445; G06N 7/005; G06N 3/0481; G06N 20/00
See application file for complete search history.

(56) References Cited

U.S. PATENT DOCUMENTS

| 2010/0235004 A1* | 9/2010 | Thind | G05B 15/02 700/277 |
| 2010/0262298 A1* | 10/2010 | Johnson | F24F 11/62 700/277 |
| 2020/0221558 A1* | 7/2020 | Liu | H05B 47/11 |

OTHER PUBLICATIONS

Wilhelm Kleiminger, Friedemann Mattern, Silvia Santini, Predicting household occupancy for smart heating control: A comparative performance analysis of state-of-the-art approaches, Energy and Buildings, vol. 85, pp. 493-505, ISSN 0378-7788, https://doi.org/10.1016/j.enbuild.2014.09.046. (Year: 2014).*

(Continued)

*Primary Examiner* — Kenneth M Lo
*Assistant Examiner* — Istiaque Ahmed
(74) *Attorney, Agent, or Firm* — Brooks Kushman P.C.

(57) ABSTRACT

A thermal state of a plurality of zones of the building is updated according to a building thermal model and information received from temperature sensors of the building. Predicted occupant counts for an upcoming plurality of time slots for each of the plurality of zones are updated using actual occupancy counts for each of the plurality of zones. A misprediction type distribution for the upcoming plurality of time slots for each of the plurality of zones is updated, the misprediction type distribution indicating misprediction for true negatives, false positives, false negatives, and true positives. A total misprediction cost expectation is updated according to the predicted occupant counts and the misprediction type distribution. HVAC power for each of the plurality of zones is determined to optimize occupant thermal comfort weighted according to the predicted occupant counts while minimizing the total misprediction cost expectation. HVAC operation is controlled per the HVAC power.

18 Claims, 11 Drawing Sheets

(56) References Cited

OTHER PUBLICATIONS

Wilhelm Kleiminger, Christian Beckel, and Silvia Santini. 2015. Household occupancy monitoring using electricity meters. In Proceedings of the 2015 ACM International Joint Conference on Pervasive and Ubiquitous Computing (UbiComp '15). Association for Computing Machinery, New York, NY, USA, 975-986. (Year: 2015).*

Wei Wang, Tianzhen Hong, Nan Li, Ryan Qi Wang, Jiayu Chen, Linking energy-cyber-physical systems with occupancy prediction and interpretation through WiFi probe-based ensemble classification, Applied Energy,vol. 236, 2019, pp. 55-69, ISSN 0306-2619, https://doi.org/10.1016/j.apenergy.2018.11.079. (Year: 2019).*

U.S. Doe, Office of Energy Efficiency & Renewable Energy, Energy Savings Potential and RD&D Opportunities for Commercial Building HVAC Systems, Dec. 2017.

Hoff et al., Activity Recognition in a Dense Sensor Network, Proceedings of 1st International Conference on Sensor Networks and Applications (SNA2009), Nov. 2009.

Scott et al., PreHeat: Controlling Home Heating Using Occupancy Prediction, UbiComp '11, Proceedings of the 13th ACM International Conference on Ubiquitous Computing, 2011.

Beckel et al., The ECO Data Set and the Performance of Non-Intrusive Load Monitoring Algorithms, BuildSys '14, Proceedings of the 1st ACM Conference on Embedded Systems for Energy-Efficient Buildings, Nov. 2014.

Lu et al., The Smart Thermostat: Using Occupancy Sensors to Save Energy in Homes, SenSys '10, Proceedings of the 8th ACM Conference on Embedded Networked Sensor Systems, Nov. 2010.

Fischer, Feedback on Household Electricity Consumption: A Tool for Saving Energy?, Energy Efficiency, vol. 1, No. 1, Feb. 2008.

Aswani et al., Reducing Transient and Steady State Electricity Consumption in HVAC Using Learning-Based Model Predictive Control, Proceedings of the IEEE, vol. 100, No. 1, Jan. 2012.

Goyal et al., Occupancy-Based Zone-Climate Control for Energy-Efficient Buildings: Complexity vs. Performance, Applied Energy, vol. 106, Jun. 2013.

Goyal et al., Zone-Level Control Algorithms Based on Occupancy Information for Energy Efficient Buildings, Proceedings of the American Control Conference (ACC), IEEE, Jun. 2012.

Ma et al., Fast Stochastic Predictive Control for Building Temperature Regulation, Proceedings of the American Control Conference (ACC), IEEE, Jun. 2012.

Erickson et al., OBSERVE: Occupancy-Based System for Efficient Reduction of HVAC Energy, IPSN '11, Proceedings of the 10th ACM/IEEE International Conference on Information Processing in Sensor Networks, Apr. 2011.

Erickson et al., POEM: Power-efficient Occupancy-based Energy Management System, IPSN '13, Proceedings of the 12th ACM International Conference on Information Processing in Sensor Networks, Apr. 2013.

Parisio et al., A Scenario-Based Predictive Control Approach to Building HVAC Management Systems, 2013 IEEE International Conference on Automation Science and Engineering (CASE), Aug. 2013.

Parisio et al., Implementation of a Scenario-Based MPC for HVAC Systems: an Experimental Case Study, Proceedings of IFAC World Congress, vol. 47, No. 3, Aug. 2014.

Parisio et al., Randomized Model Predictive Control for HVAC Systems, BuildSys '13, Proceedings of the 5th ACM Workshop on Embedded Systems for Energy-Efficient Buildings, Nov. 2013.

Ahmad et al., Building Energy Metering and Environmental Monitoring—A State-of-the-Art Review and Directions for Future Research, Energy and Buildings, vol. 120, Jan. 2016.

Gorecki et al., OpenBuild: An Integrated Simulation Environment for Building Control, 2015 IEEE Conference on Control Applications (CCA), 2015.

Fabietti et al., Experimental Implementation of Frequency Regulation Services Using Commercial Buildings, IEEE Transactions on Smart Grid, 2016, vol. 9, No. 3.

Liu et al., Understanding Occupancy Patterns in a Commercial Space, 2018.

Olesen et al., Introduction to thermal comfort standards and to the proposed new version of EN ISO 7730, Energy and Buildings, 2002, pp. 537-548, vol. 34, No. 6.

Hafeez et al., Inverting HVAC for Energy Efficient Thermal Comfort in Populous Emerging Countries, BuildSys '17, Proceedings of the 4th ACM International Conference on Systems for Energy-Efficient Built Environments, Nov. 2017.

Dong et al., Occupancy-Based HVAC Control with Short-Term Occupancy Prediction Algorithms for Energy-Efficient Buildings, Energies, vol. 11, No. 9, Sep. 2018.

Beltran et al., Optimal HVAC Building Control with Occupancy Prediction, BuildSys '14, Proceedings of the 1st ACM Conference on Embedded Systems for Energy-Efficient Buildings, Nov. 2014.

Zhao et al., Occupant Behavior and Schedule Prediction Based on Office Appliance Energy Consumption Data Mining, CISBAT 2013 Conference—Clean Technology for Smart Cities and Buildings, Sep. 2013.

Crawley et al., Energy Plus: Creating a New-Generation Building Energy Simulation Program, Energy and Buildings, vol. 33, No. 4, Apr. 2001.

Reena et al., Real-Time Occupancy Based HVAC Control Using Interval Type-2 Fuzzy Logic System in Intelligent Buildings, 12th IEEE Conference on Industrial Electronics and Applications (ICIEA), Jun. 2017.

Erickson et al., Occupancy Based Demand Response HVAC Control Strategy, BuildSys '10, Proceedings of the 2nd ACM Workshop on Embedded Sensing Systems for Energy-Efficiency in Building, Nov. 2010.

Hu et al., Model Predictive Control Strategies for Buildings With Mixed-Mode Cooling, Building and Environment, vol. 71, Jan. 2014.

Jia et al., Privacy-Enhanced Architecture for Occupancy-Based HVAC Control, Proceedings of the ACM/IEEE 8th International Conference on Cyber-Physical Systems (ICCPS), Apr. 2017.

Winkler et al., FORCES: Feedback and Control for Occupants to Refine Comfort and Energy Savings, UbiComp '16, Proceedings of the 2016 ACM International Joint Conference on Pervasive and Ubiquitous Computing, Sep. 2016.

Erickson et al., Thermovote: Participatory Sensing for Efficient Building HVAC Conditioning, BuildSys '12, Proceedings of the 4th ACM Workshop on Embedded Sensing Systems for Energy-Efficiency in Buildings, Nov. 2012.

Balaji et al., ZonePAC: Zonal Power Estimation and Control via HVAC Metering and Occupant Feedback, BuildSys'13, Proceedings of the 5th ACM Workshop on Embedded Systems For Energy-Efficient Buildings, Nov. 2013.

Hang-Yat et al., Carrying My Environment with Me: A Participatory-Sensing Approach to Enhance Thermal Comfort, BuildSys'13, Proceedings of the 5th ACM Workshop on Embedded Systems for Energy-Efficient Buildings, Nov. 2013.

Jazizadeh et al., Toward Adaptive Comfort Management in Office Buildings Using Participatory Sensing for End User Driven Control, BuildSys '12, Proceedings of the 4th ACM Workshop on Embedded Sensing Systems for Energy-Efficiency in Buildings, Nov. 2012.

Mansourifard et al., Online Learning for Personalized Room-Level Thermal Control: A Multi-Armed Bandit Framework, BuildSys'13, Proceedings of the 5th ACM Workshop on Embedded Systems for Energy-Efficient Buildings, Nov. 2013.

Beltran et al., ThermoSense: Occupancy Thermal Based Sensing for HVAC Control, BuildSys'13, Proceedings of the 5th ACM Workshop on Embedded Systems for Energy-Efficient Buildings, Nov. 2013.

Balaji et al., Sentinal: Occupancy Based HVAC Actuation Using Existing WiFi Infrastructure Within Commercial Buildings, SenSys '13, Proceedings of the 11th ACM Conference on Embedded Networked Sensor Systems, Nov. 2013.

Mamidi et al., Improving Building Energy Efficiency with a Network of Sensing, Learning and Prediction Agents, AAMAS '12,

(56) References Cited

OTHER PUBLICATIONS

Proceedings of the 11th International Conference on Autonomous Agents and Multiagent Systems, vol. 1, Jun. 2012.
Brandemuehl et al., The Impact of Demand-Controlled and Economizer Ventilation Strategies on Energy Use in Buildings, ASHRAE Transactions, vol. 105, 1999.

* cited by examiner

HVAC CONTROL FINE-GRAINED OCCUPANCY PATTERN ESTIMATION

STATEMENT REGARDING FEDERALLY SPONSORED RESEARCH OR DEVELOPMENT

This invention was made with government support under DE-EE0007682 awarded by the Department of Energy and CNS-1553273 awarded by the National Science Foundation. The government has certain rights to the invention.

TECHNICAL FIELD

The present disclosure relates to leveraging fine-grained occupancy estimation patterns for effective heating, ventilation, and air conditioning (HVAC) control.

BACKGROUND

HVAC is a major source of energy consumption in the U.S. In 2017, approximately 30% of energy consumption for commercial buildings in the U.S. was used for HVAC. Usually, building operators use a static schedule for controlling HVAC systems without having a deeper understanding of how many people use the building at different times of the day. In addition, many HVAC systems operate by assuming maximum occupancy in each room. This can lead to significant energy waste, e.g., an HVAC system providing ventilation for thirty people when there are only ten people in a room. Such widely used HVAC control designs miss opportunities to perform more accurate and efficient control.

SUMMARY

In one or more illustrative examples, a method for controlling HVAC operation of a building to minimize energy consumption using predicted occupant-counts and accounting for misprediction cost, includes updating a thermal state of a plurality of zones of the building according to a building thermal model and information received from temperature sensors of the building; updating predicted occupant counts for an upcoming plurality of time slots for each of the plurality of zones using actual occupancy counts for each of the plurality of zones; updating a misprediction type distribution for the upcoming plurality of time slots for each of the plurality of zones, the misprediction type distribution indicating misprediction for true negatives, false positives, false negatives, and true positives; updating a total misprediction cost expectation according to the predicted occupant counts and the misprediction type distribution; determining HVAC power for each of the plurality of zones to optimize occupant thermal comfort weighted according to the predicted occupant counts while minimizing the total misprediction cost expectation, the determining being constrained to a heat exchange configuration of the building and minimum and maximum HVAC power available to each of the plurality of zones; and controlling HVAC operation of the building according to the HVAC power determined for each of the plurality of zones.

In one or more illustrative examples, a system for controlling HVAC operation of a building to minimize energy consumption using predicted occupant-counts and accounting for misprediction cost, includes an HVAC controller programmed to update a thermal state of a plurality of zones of the building according to a building thermal model and information received from temperature sensors of the building; update predicted occupant counts for an upcoming plurality of time slots for each of the plurality of zones using actual occupancy counts for each of the plurality of zones; update a misprediction type distribution for the upcoming plurality of time slots for each of the plurality of zones, the misprediction type distribution indicating misprediction for true negatives, false positives, false negatives, and true positives; update a total misprediction cost expectation according to the predicted occupant counts and the misprediction type distribution; determine HVAC power for each of the plurality of zones to optimize occupant thermal comfort weighted according to the predicted occupant counts while minimizing the total misprediction cost expectation, the determining being constrained to a heat exchange configuration of the building and minimum and maximum HVAC power available to each of the plurality of zones; and control HVAC operation of the building according to the HVAC power determined for each of the plurality of zones.

In one or more illustrative examples, a non-transitory computer readable medium includes instructions for controlling heating, ventilation, and air conditioning (HVAC) operation of a building to minimize energy consumption using predicted occupant-counts and accounting for misprediction cost, that, when executed by an HVAC controller, cause the HVAC controller to update a thermal state of a plurality of zones of the building according to a building thermal model and information received from temperature sensors of the building; update predicted occupant counts for an upcoming plurality of time slots for each of the plurality of zones using actual occupancy counts for each of the plurality of zones; update a misprediction type distribution for the upcoming plurality of time slots for each of the plurality of zones, the misprediction type distribution indicating misprediction for true negatives, false positives, false negatives, and true positives; update a total misprediction cost expectation according to the predicted occupant counts and the misprediction type distribution; determine HVAC power for each of the plurality of zones to optimize occupant thermal comfort weighted according to the predicted occupant counts while minimizing the total misprediction cost expectation, the determining being constrained to a heat exchange configuration of the building and minimum and maximum HVAC power available to each of the plurality of zones; and control HVAC operation of the building according to the HVAC power determined for each of the plurality of zones.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Some buildings include coarse-grained occupancy sensors that provide binary data related to building occupancy patterns (e.g., whether a space is occupied or not). Fine-grained occupancy sensors are increasingly being deployed in modern commercial buildings. These fine-grained occupancy sensors provide occupancy count information in real-time, as opposed to simply whether or not a space is occupied. This occupancy count information can benefit building HVAC control to improve building energy efficiency, provide occupant thermal comfort, and enhance building management. By using the fine-grained occupancy sensor data, predictive models can be designed that capture the spatiotemporal nature of occupancy dynamics. Using such a predictive model, a model predictive control algorithm for HVAC control can be implemented that achieves significant energy savings.

Figure 1:
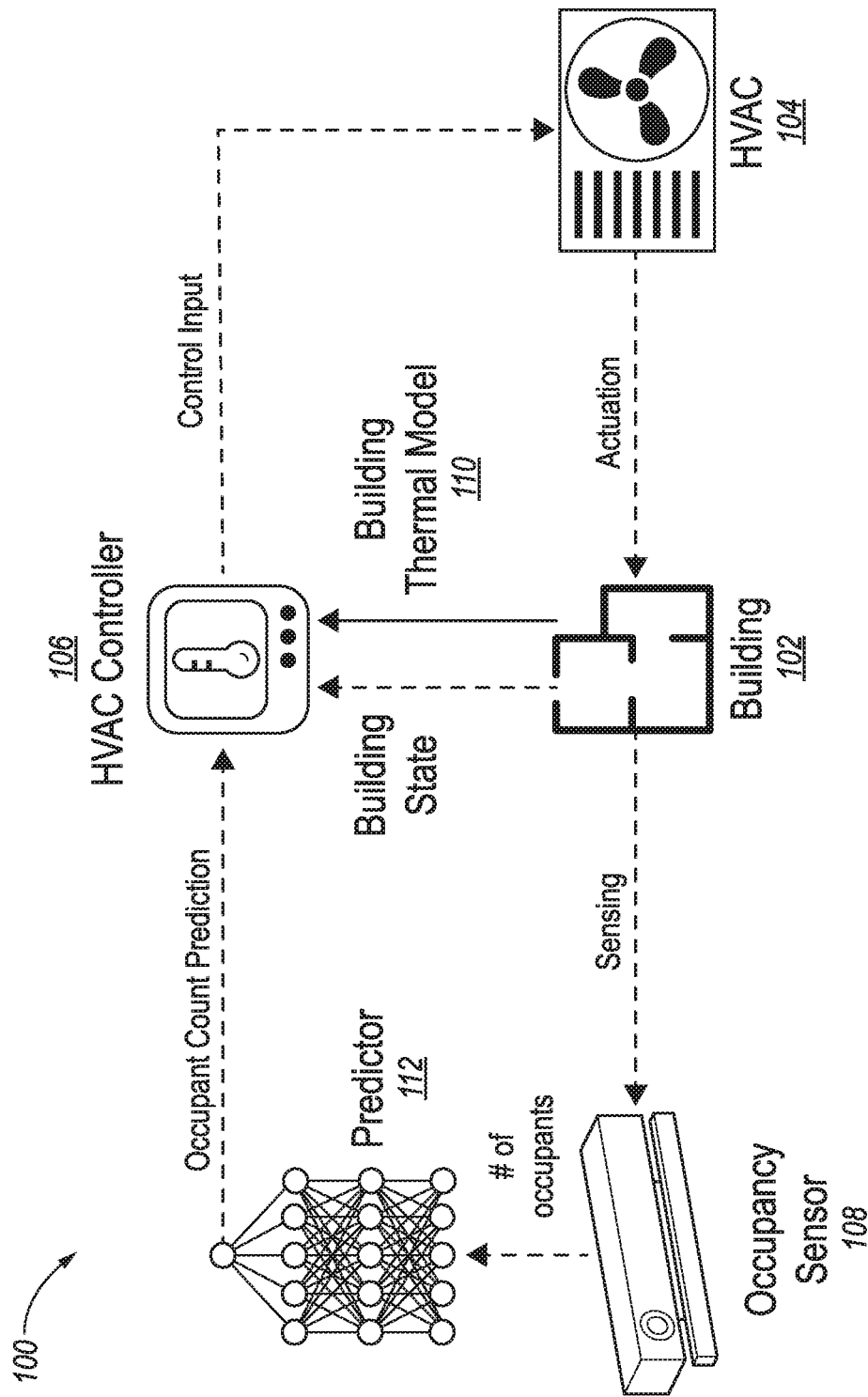
FIG. 1 illustrates an example occupancy-aware HVAC control system for a building.

FIG. 1 illustrates an example occupancy-aware HVAC control system 100 for a building 102. As shown, the building 102 includes occupancy sensors 108 configured to sense occupancy of the building 102. An occupant count predictive model 112 receives, from the occupancy sensors 108, a number of occupants sensed in the building. The occupant count predictive model 112 outputs, based on the current real-time and historical sensed occupant information, an occupant count prediction that indicates a predicted number of occupants in each zone of the building 102 for various time slots. An HVAC controller 106 is configured to receive the occupant count prediction and a building state including temperature information in the building, as well as maintain a building thermal model 110. The building thermal state is detected via building monitoring systems, such as temperature sensors located in the zones of the building 102. The building thermal model 110 may be based on building 102 data (such as floor plan, building material, HVAC system deployment, etc.). Using the occupant count prediction and the building state, the HVAC controller 106 provides control input to the building HVAC 104. Actuation of the building HVAC 104 in turn affects the building state. Accordingly, the occupancy-aware HVAC control system 100 adaptively adjusts the building HVAC 104 to maintain occupant comfort and save energy according to predicted occupant count and real time building thermal state. It should be noted that the illustrated HVAC control system 100 is an example, and systems with more, fewer, or differently arranged elements may be used.

The building 102 may be an enclosed structure in which a climate is controlled by the occupancy-aware HVAC control system 100. In many examples, the building 102 has walls, a roof, windows, and in many cases more than one level. The building 102 may include one or more rooms as well as doors or other openings through which occupants may enter and exit. In some examples, the building 102 may be divided into logical zones. Each zone may include a subset of the one or more rooms or other areas of the building 102. In some systems 100, the zones of the building 102 are defined or otherwise relate to areas of the building 102 under separate HVAC control.

The building HVAC 104 refers to the heating, ventilation, and air conditioning systems in the building 102 that are used to heat, vent, and/or cool the zones of the building 102. In addition to temperature and humidity control, the building HVAC 104 may also be used to improve the quality of environmental conditions inside the building 102, such as the removal of smoke, odors, dust, airborne bacteria, carbon dioxide, as well as to perform oxygen replenishment.

The HVAC controller 106 includes one or more devices configured to direct the building HVAC 104 to control the environment of the building 102. The HVAC controller 106 may include one or more processors configured to perform instructions, commands, and other routines in support of the processes described herein. Such instructions, and other data, may be maintained in a non-volatile manner using a variety of types of computer-readable storage medium. The data may be loaded from the storage medium into a memory to be accessed by the processor. The computer-readable storage medium (also referred to as a processor-readable medium or storage) includes any non-transitory medium (e.g., a tangible medium) that participates in providing instructions or other data that may be read by the processor of the telematics controller. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

The occupancy sensors 108 may include various types of devices configured to detect the presence or absence of occupants in rooms of the building 102. As some examples, the occupancy sensors 108 may include one or more of ultrasonic sensors, passive infra-red (PIR) sensors, or reg-green-blue (RGB) cameras. As one specific example of a motion sensor, a depth sensor (e.g., such as the KINECT sensor for the MICROSOFT XBOX) may be used, e.g., mounted on the ceiling near a doorway to estimate occupancy. The depth sensor may be used in combination with an occupancy estimator algorithm (e.g., the Fine-grained Occupancy estimatoR using Kinect (FORK)). In such an example, real-time depth frames from occupancy sensors 108 placed at each doorway are provided to the algorithm, allowing the algorithm to estimate and update occupancy counts for the rooms (or zones) responsive to occupants entering or exiting through the doorways.

The building thermal model 110 may be a dynamic model that describes how the building 102 thermal state changes. These changes may be based on factors such as HVAC power and number of occupants. One example model is shown in the following equation:

$$x(k+1)=Ax(k)+B_u u(k)+B_d d(k), y(k)=Cx(k)$$

where:
$x_i(k)$ is the state vector (containing the temperatures, surfaces, and internal nodes) by the end of time slot k of zone i;
d(k) is a column vector to represent the external (e.g., outside temperature and solar gains) and internal (e.g., occupants) gains disturbance vector during time slot k;
y(k) is a length n column vector denoting the indoor temperature by the end of time slot k for n regions; and
A, $B_u$, $B_d$ and C are fixed parameter matrices which are specified by the building configurations.

It is noted that these fixed parameters not only describe how the state of one zone i is affected by the state, action, and disturbance of this zone, but also consider the heat exchange among zones. For instance, xi(k+1) may be determined by a linear model of x(k), u(k), and d(k), where the parameters are the i-th row of matrix A, $B_u$, and $B_d$. Some elements of d(k) represent the heat load due to occupant heat emission, while others describe the heat exchange with surrounding environment. Suppose each occupant emits the same amount of heat, and the indoor human heat emission is formulated as $e_{heat} \times Occ_i(k)$, where $e_{heat}$ is the heat emitted by an occupant during one time slot, and $Occ_i(k)$ is the actual number of occupants in zone i for time slot k. For a zone that does not exchange heat directly with the ambient, the corresponding elements in $B_d$ may be set to zero.

The occupant count predictive model 112 is a model configured to receive the number of occupants information from the occupancy sensors 108, and to predict future occupancy counts in zone i for the next N time slots. In an example, the occupant-count is a forcing-function that does not depend on any state variables except time. The effect of occupants appears in the dynamics as an internal heat gain to the thermal state of the building. By using the occupant count predictive model 112 to predict the number of occupants accurately for a time horizon, the HVAC controller 106 can make informed decisions to counteract this disturbance and stabilize the thermal condition of the building 102. As described herein, statistical models may be trained on real-world data that can be leveraged to predict occupancy changes, such that at the end of the current time slot t and with previous occupancy counts, the model 112 can predict the future occupancy counts in zone i for the next N time slots. This is denoted herein as $\widehat{Occ_i}(t+1)$, $\widehat{Occ_i}(t+2)$, ..., $\widehat{Occ_i}(t+N)$.

Figure 2:
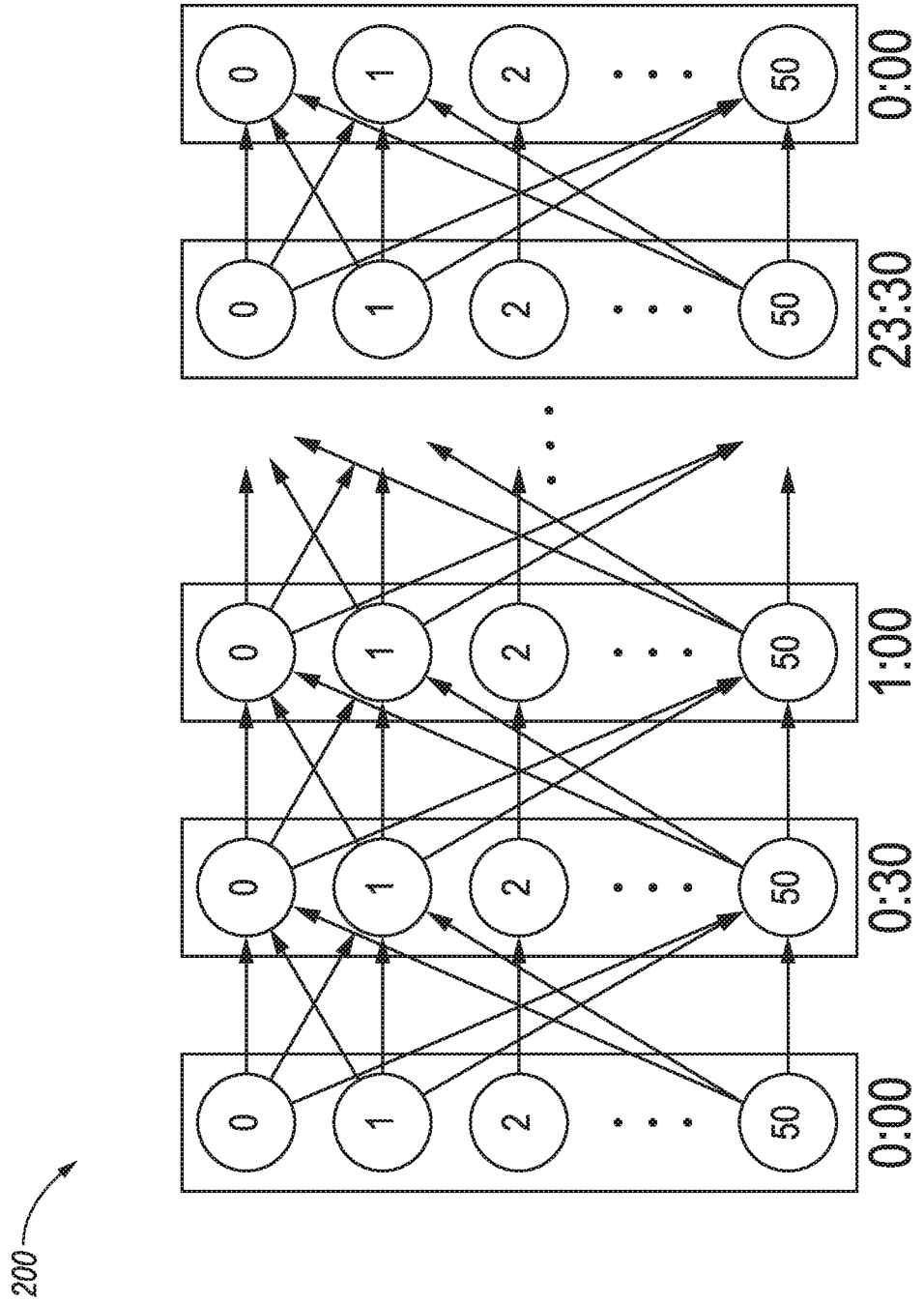
FIG. 2 illustrates an example of occupancy dynamics as a time inhomogeneous Markov chain unrolled for one day.

FIG. 2 illustrates an example of occupancy dynamics as a time inhomogeneous Markov chain unrolled for one day. For a baseline, occupancy dynamics may be modeled with a time-inhomogeneous Markov Chain, where the state represents the occupant count and the transition between states refers to occupancy change temporally. Given the nature of occupancy, the Markov Chain is naturally time inhomogeneous: the probability distribution of the next state depends on the current state and the current time. Therefore, at time slot t, the probability of the future occupant count at the next time slot being $m_2$, given the current count $m_1$, is:

$$P(\widehat{Occ_i}(t+1)=m_2 | Occ_i(t)=m_1)$$

In an example, a fixed time slot duration of 30 minutes and an occupant count within a range from 0 to 50 (max count) may be used, such that the time-inhomogeneous Markov Chain can be unrolled temporally as shown in FIG. 2, in which the occupancy state of a whole day is represented as a chain of 48 states. Here, it is assumed the state dynamics do not differ from day to day. Thus, the structure of the chain may repeat itself after 48 states.

Using historical occupancy data to estimate the transition probability, an N-step prediction may be made by taking the expectation of future counts after N steps as follows:

$$\widehat{Occ_i}(t+N) = \Sigma_{m_2} m_2 \times P(Occ_i(t+N)=m_2 | Occ_i (t+N-1)) \ldots P(Occ_i(t+1)|Occ_i(t)=m1)$$

It is possible that some states do not appear once in the training data but occur after training. In that case, the closest state transition may be utilized.

The Markov Chain requires that the occupancy dynamics obey such assumptions as the Markov property, which may not be true in practice. Therefore, a linear regression model may further be implemented to make predictions, such as follows:

$$\widehat{Occ_i}(t+1) = \Sigma_j^T \beta_j Occ_i(t-j) + \text{bias}$$

The predicted occupancy at t+1 can be fed into the regression function again to predict the occupancy at t+2. After unrolling for N steps, N future occupant counts may be predicted. In this model, there are T coefficients $\beta_j$ and a bias term as the parameter to be trained on.

Figure 3:
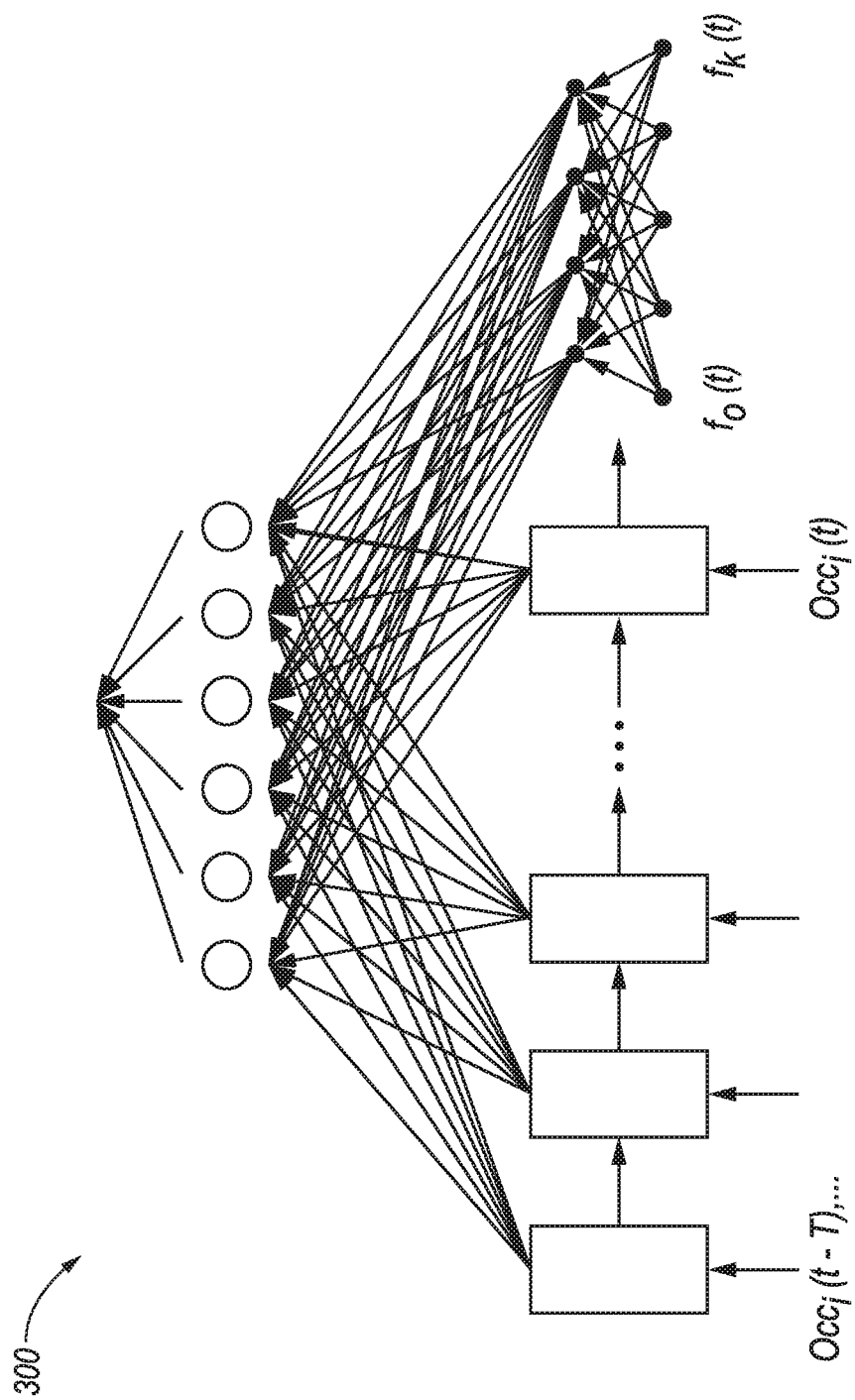
FIG. 3 illustrates a proposed network that combines temporal and contextual features to predict the next N occupancy count.

FIG. 3 illustrates a proposed network that combines temporal and contextual features to predict the next N occupancy count. As the occupancy dynamics are inherently non-linear, with the prolonged period of data that may be collected, statistical models may be used that have higher representative power, meanwhile generalizing well without over-fitting.

With a neural network, the prediction may be cast as a regression problem. The recurrent part of a neural network is a function that takes the occupant count in T previous time slots as input and connects to the final N neurons, which represented the value of the future occupancy counts of the next N time slots. This recurrent function is shown as the rectangular box in FIG. 3, which consists of two hidden layers with 32 units (i.e., neurons) each and rectified linear unit (ReLU) activation. (It should be noted that this neural network configuration is only an example and neural networks using different numbers of neurons and/or different numbers of layers may be used.) Besides the sequential occupant count, other contextual information may be leveraged, such as time of the day and day of the week in the prediction. Therefore, a fully-connected layer may transform the categorical feature $f_0(t), \ldots, f_K(t)$ to a one-hot encoding (e.g., the time of the day feature is discretized into 24 columns as hour) and again connects to the final N units. So, the pyramid-like architecture in FIG. 3 illustrates how the temporal and contextual information can be combined to make the final occupancy prediction at the top level. This architecture is flexible to incorporate a more categorical feature that may be available in different applications and usage of the building 102 space.

The occupancy-aware model predictive HVAC controller 106 has two objectives: minimizing HVAC energy consumption and optimizing occupant thermal comfort. At the beginning of time slot t, the model predictive HVAC controller 106 considers the HVAC control for future N time slots and computes the HVAC power sequence in this horizon to optimize these two objectives.

With respect to the first goal, the occupancy-aware HVAC controller 106 may reduce energy waste based on occupancy prediction, especially when zero occupancy is correctly predicted during working hours, e.g., occupants arrive late in the morning or leave early in the evening. The HVAC power for one zone i during time slot k may be constrained as follows:

$$\underline{U_i} \leq u_i(k) \leq \overline{U_i}$$

where $\underline{U_i}$ and $\overline{U_i}$ represent the cooling and heating capacity of the building HVAC 104, respectively. If $u_i(k)$ is positive, it indicates that the HVAC system is heating the zone; otherwise, the building HVAC 104 is cooling the zone. The $u_i(k)$ refers to the amount of heat flux from the building HVAC 104 that is acting on the zone. Because larger values of $u_i(k)$ would imply more HVAC energy consumption, the L1-norm of $u_i(k)$ is used as a proxy of energy consumption. The total power consumption may be represented as $\Sigma_{k=t}^{t+N-1} \Sigma_{i=1}^{n} |u_i(k)|$.

With respect to the second goal, the occupancy-aware HVAC controller 106 may optimize occupant thermal comfort. Predicted mean vote (PMV) is a common comfort measurement, which is standardized in ISO 7730. The PMV model estimates the average occupant comfort level using a function as follows:

$$PMV(\cdot):PMV(M, T_a, T_r, v, P_a, I_{cl})$$

where
M is the metabolic rate of the occupant;
$T_a$ is the air temperature;
$T_r$ is the mean radiant temperature (set equal to $T_a$);
v is the relative air velocity;
$P_a$ is the relative humidity; and
$I_{cl}$ is the clothing insulation factor of the occupant.

The range of PMV may be defined herein as being between −3 (representing cold) and 3 (representing hot), where 0 is neutral. However, this is arbitrary and other scales may be used. To simplify the description, let $PMV_i(k)$ to describe the individual occupant comfort for zone i in time slot k.

To make HVAC work efficiently, the weighted occupant comfort is considered, meaning: (i) occupant thermal comfort is ensured if the zone of the building 102 is occupied, and (ii) the more occupants there are in the zone, the more comfortable the indoor environment becomes. An objective for providing group occupant comfort may therefore be formulated as $\Sigma_{k=t}^{t+N-1} \Sigma_{i=1}^{n} Occ_i(k) |PMV_i(k)|$.

There exists a trade-off between the two objectives. For example, if the outside weather is cold, e.g., below 0° C., to make occupants comfortable, HVAC should heat the zones. However, this would induce high energy cost. Therefore, one weight β is used to sum up and balance the two objectives, and the problem for the model predictive HVAC controller 106 is therefore formulated as equation (1) as follows:

$$\min_{u(k), x(k)} \sum_{k=t}^{t+N-1} \sum_{i=1}^{n} (|u_i(k)| + \beta Occ_i(k)|PMV_i(k)|) \quad (1)$$

s.t. $x(k+1) = Ax(k) + B_u u(k) + B_d d(k)$
$y(k) = Cx(k)$
$\underline{U_i} \leq u_i(k) \leq \overline{U_i}$ where $\underline{U_i} \leq u_i(k) \leq \overline{U_i}$ constrains the HVAC power for each zone i. Let $P(Occ(t))$ denote the above equation with actual occupant-count $Occ(t)=\{Occ_i(k)|1 \leq i \leq n, t \leq k \leq t+N-1\}$. However, at the beginning of time slot t, the actual occupant-count $Occ(t)$ is unknown for the controller 106. Therefore, predicted occupant-count is used as the input parameters of the controller 106 to determine the HVAC power and the model predictive HVAC control problem is denoted as $P(\widehat{Occ}(t))$, where $\widehat{Occ}(t) = \{\widehat{Occ_i}(k)|1 \leq t \leq n, t \leq k \leq t+N-1\}$. In an example, the three predictors may be used: time-inhomogeneous Markov Chain, linear regression, and sequential and contextual neural network to predict $\widehat{Occ}(t)$ based on the historical collected data and realtime occupancy information at the beginning of time slot t. Since the objective and constraints are convex functions, they may be solved by existing solvers, such as Gurobi, which is used in OpenBuild.

Based on the previous description, the predictive HVAC controller 106 uses the occupancy-aware model predictor 112 to determine the power for each zone i of the building 102 based on the predicted occupancy count for future time slots. However, this performance may be affected by prediction accuracy due to occupancy pattern uncertainty.

To analyze this performance, misprediction and misprediction on occupant-count may be defined. Misprediction refers to the predictor mis-predicting the occupied or unoccupied status for the future time slots, and the misprediction on occupant-count refers to where the predictor estimates the number of occupants in one zone for the future time slots incorrectly. Accordingly, there may be two measurement metrics: misprediction type distribution and prediction error to measure the performance of one predictor. The misprediction may be classified into one of four categories: false positive, false negative, true positive and true negative, which is shown in Table 1.

TABLE 1

Misprediction classification

| | | Prediction of occupancy | |
|---|---|---|---|
| | | unoccupied | occupied |
| Truth of occupancy | unoccupied | True negative | False positive |
| | occupied | False negative | True positive |

If both truth and prediction of occupancy are occupied, the misprediction type is marked as true positive. If both truth and prediction of occupancy are unoccupied, the misprediction type is marked as true negative. If the predictor mispredicts occupied as unoccupied or unoccupied as occupied, the misprediction is noted as being as false negative or false positive, respectively. The prediction error may be used to measure the misprediction on occupant-count, and is equal to the absolute value of the difference between the predicted number of occupants and the ground truth.

Figure 4:
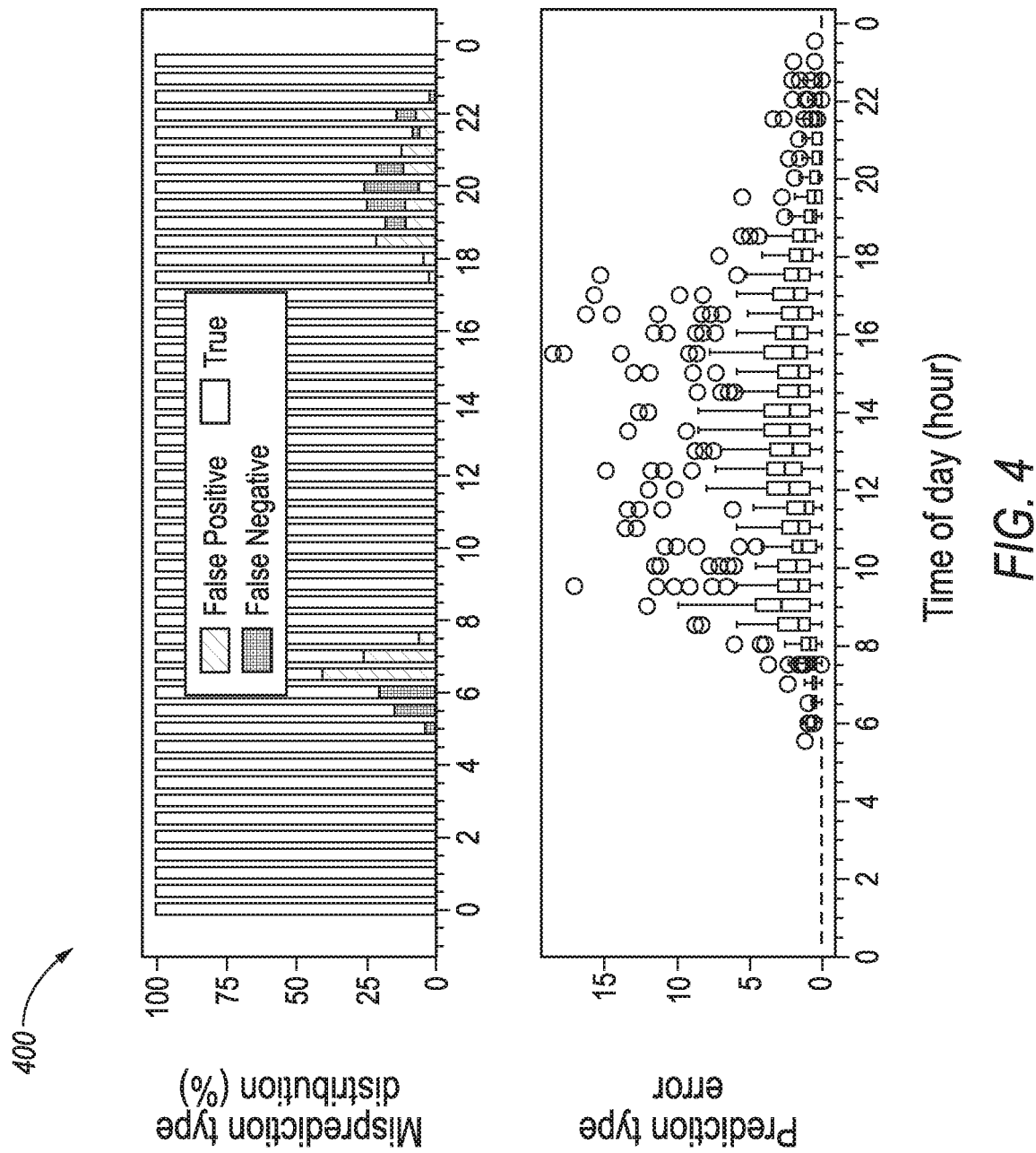
FIG. 4 illustrates performance of a time-inhomogeneous Markov Chain predictor.
Figure 5:
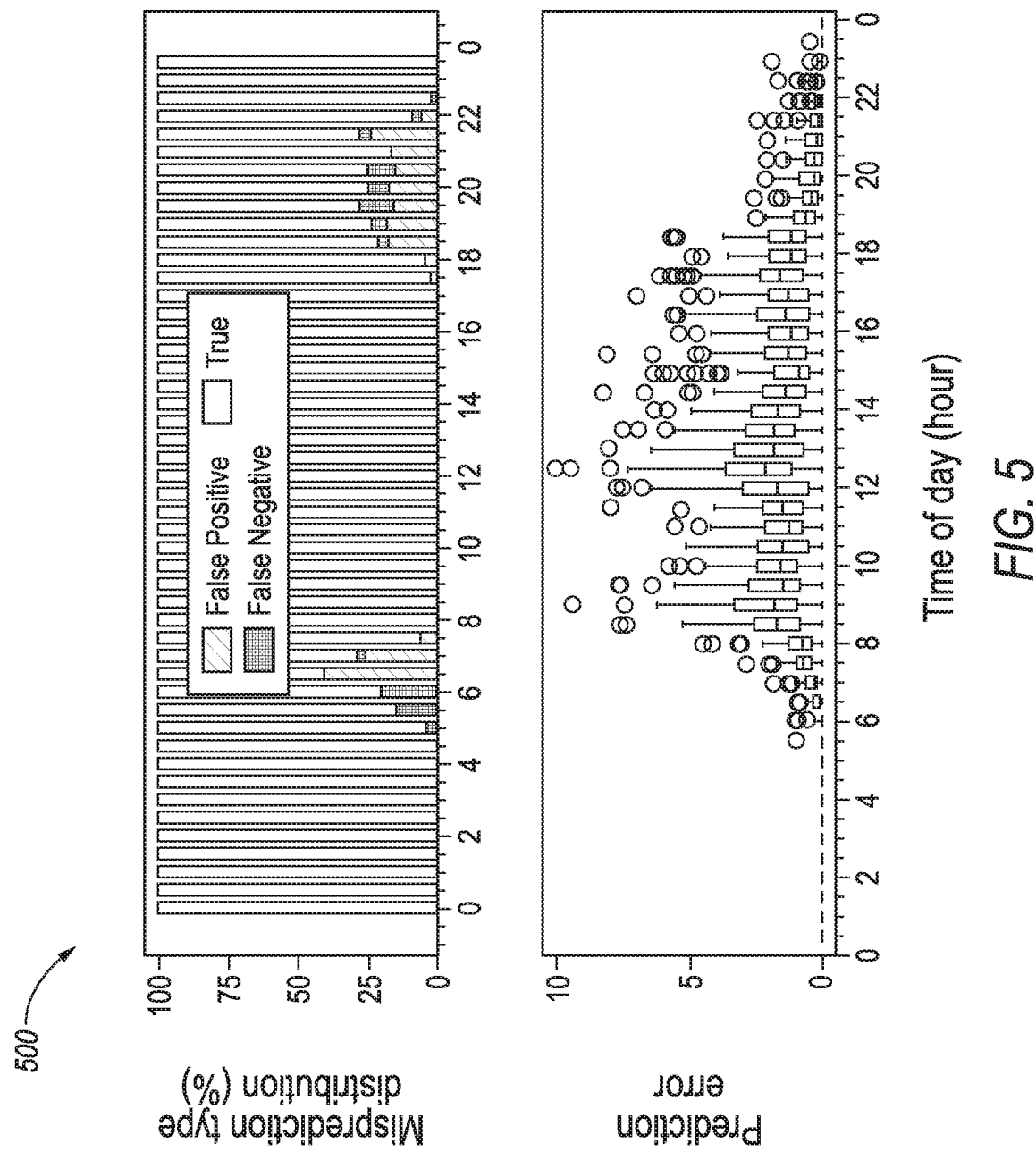
FIG. 5 illustrates performance of a linear regression predictor.
Figure 6:
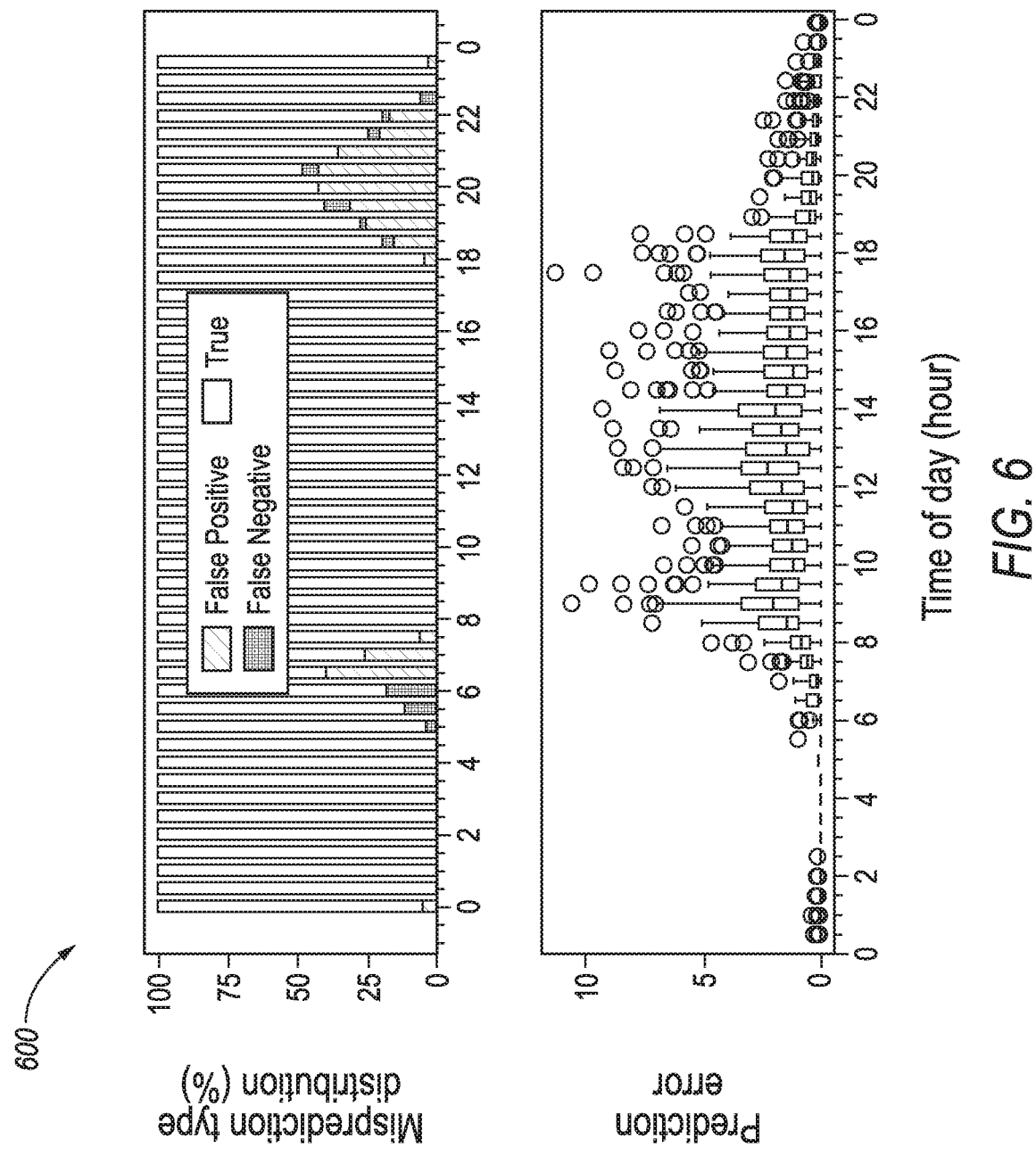
FIG. 6 illustrates performance of a sequential and contextual neural network predictor.

FIG. 4 illustrates performance of a time-inhomogeneous Markov Chain predictor. FIG. 5 illustrates performance of a linear regression predictor. FIG. 6 illustrates performance of a sequential and contextual neural network predictor. Since predicting the occupancy status correctly does not influence the control performance, true positives and true negatives are combined as true. It can be observed that each predictor incorrectly predicts the occupancy index at the beginning and end of the day with a probability relatively larger than that in the middle of the day. Meanwhile, during the working hours of a day, the predicted occupancy index is always true, whereas, the predictor error is small at the beginning and end of the day and is large during the working hours.

Figure 7:
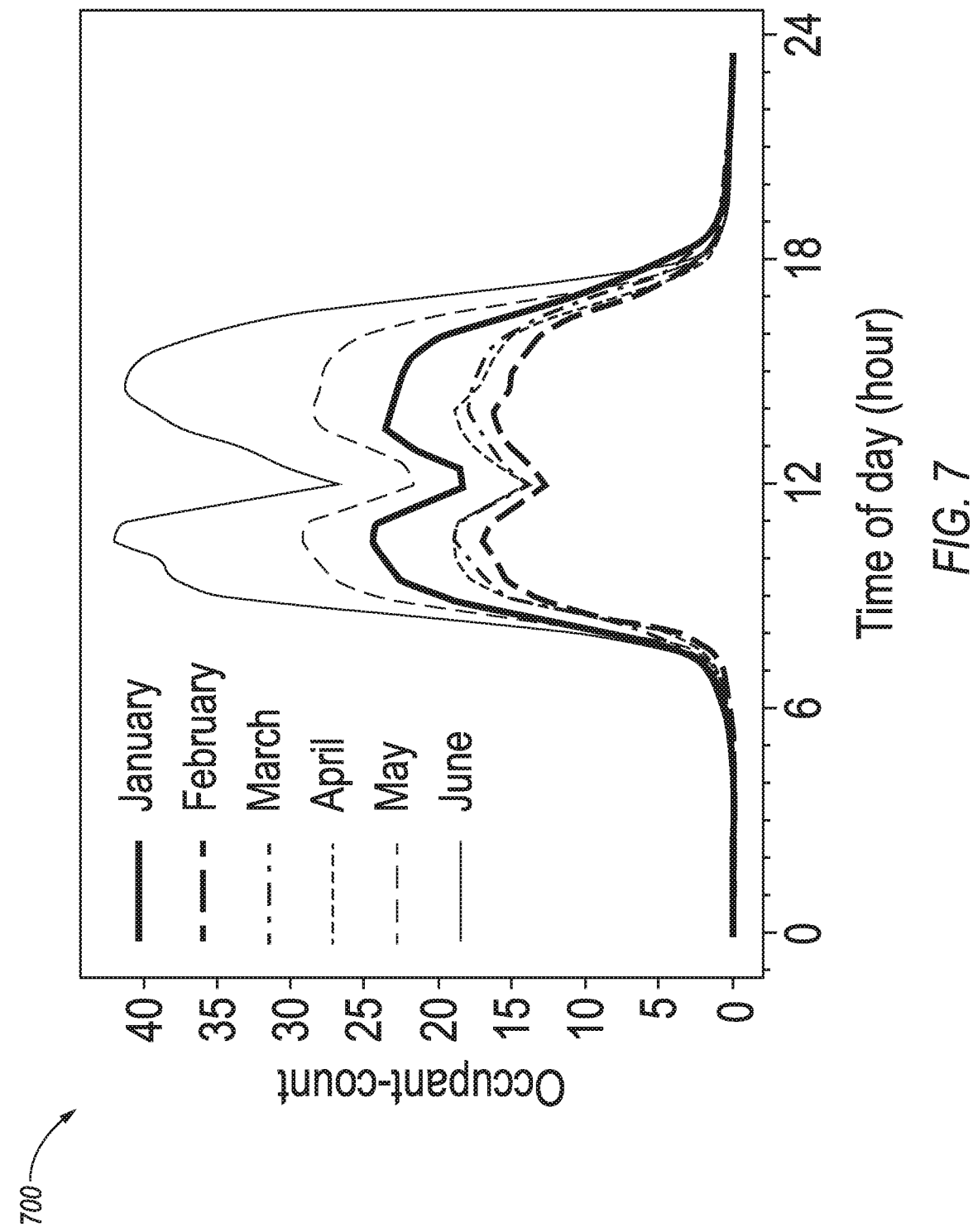
FIG. 7 illustrates average occupant-count over one day for six months.

FIG. 7 illustrates average occupant-count over one day for six months. As can be seen, there are few occupants in the zone during the large misprediction probability period, which is a possible reason for the predictor to mis-predicts the occupancy status with a higher probability compared with the probability during the high occupant density period. The occupancy pattern variation over months in the example data of FIG. 7 can be explained according to seasonal variations in staffing.

Based on the prediction accuracy of the three predictors, performance of an occupancy-aware HVAC controller 106 with any of the three predictors may be identified. To measure the performance, a measurement metric may be defined as the energy efficiency times effective PMV improvement to measure the combination of energy efficiency and how much occupant comfort is offered. To calculate energy efficiency and effective PMV improvement for time slot k: (i) based on the actual detection of occupant-count in time slot k, Occi(k) and the initial building state x(k−1), the one time slot version of Equation (1) is solved to determine the optimal HVAC power $u_i(k)$ and comfort value $PMV_i(k)$; and (ii) the energy efficiency and effective PMV improvement are computed as follows:

$$\text{Energy efficiency} = \begin{cases} \dfrac{\min\{u_i(k), \widehat{u}_i(k)\}}{\widehat{u}_i(k)} & \text{if } \widehat{u}_i(k) \neq 0 \\ 1 & \text{if } \widehat{u}_i(k) = 0 \end{cases}$$

$$\text{Effective } PMV \text{ improvement} = \begin{cases} |\overline{PMV}_i(k) - F| & \text{if } Occ_i(k) \neq 0 \\ 3 & \text{if } Occ_i(k) = 0 \end{cases}$$

where F is the extreme value of PMV (e.g., −3 for cold and 3 for hot). Using measurement metrics, if HVAC consumes the energy while the zone is unoccupied, its efficient energy consumption ratio is 0 because the optimal energy consumption is 0, and if there are occupants, the control performance is determined by the PMV improvement and energy efficiency regarding the model predictive HVAC control using true occupant-count.

Figure 8:
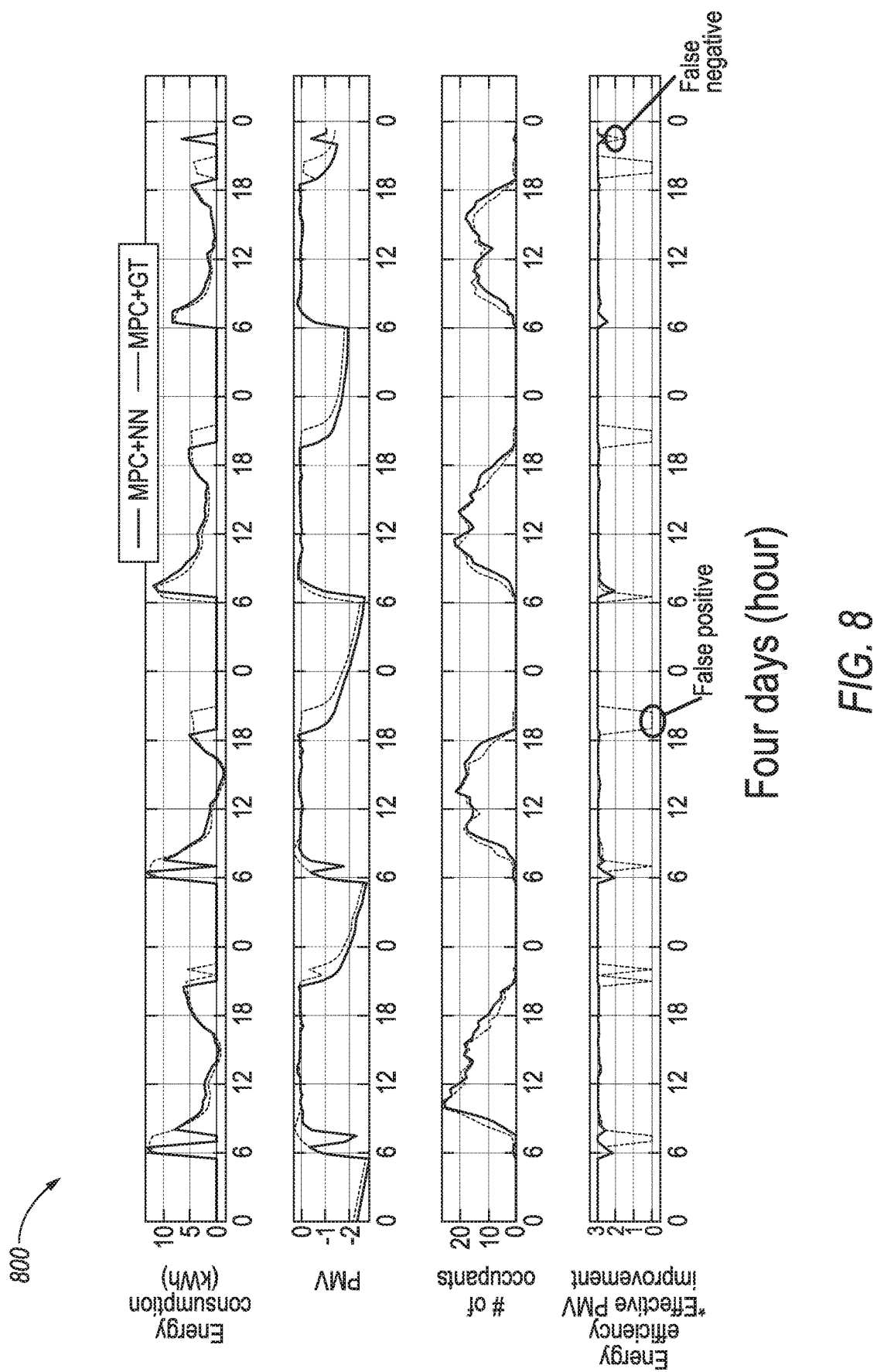
FIG. 8 illustrates an example of performance of the HVAC controller using neural network predicted occupant counts and ground truth.

FIG. 8 illustrates an example of performance of the HVAC controller 106 using neural network predicted occupant counts and ground truth. As shown, the example is over a period of four days. The neural network may be a sequential and contextual neural network as mentioned above.

As described above, there are two objectives of HVAC control, minimizing energy consumption and maximizing group occupant comfort, and there exists a tradeoff between these two objectives. The HVAC controller 106 should aim at minimizing energy consumption if there is no occupant in one time slot and consider minimizing one weighted sum of energy consumption and group occupant comfort for a time slot with occupants. However, due to the misprediction, the HVAC controller 106 using predicted occupant-count optimizes HVAC control with incorrect objectives. Therefore, in order to handle the misprediction, especially the random false positive/negative case, the HVAC controller 106 should determine the HVAC power, which is robust to the misprediction and introduces a minimum misprediction cost.

Figure 9:
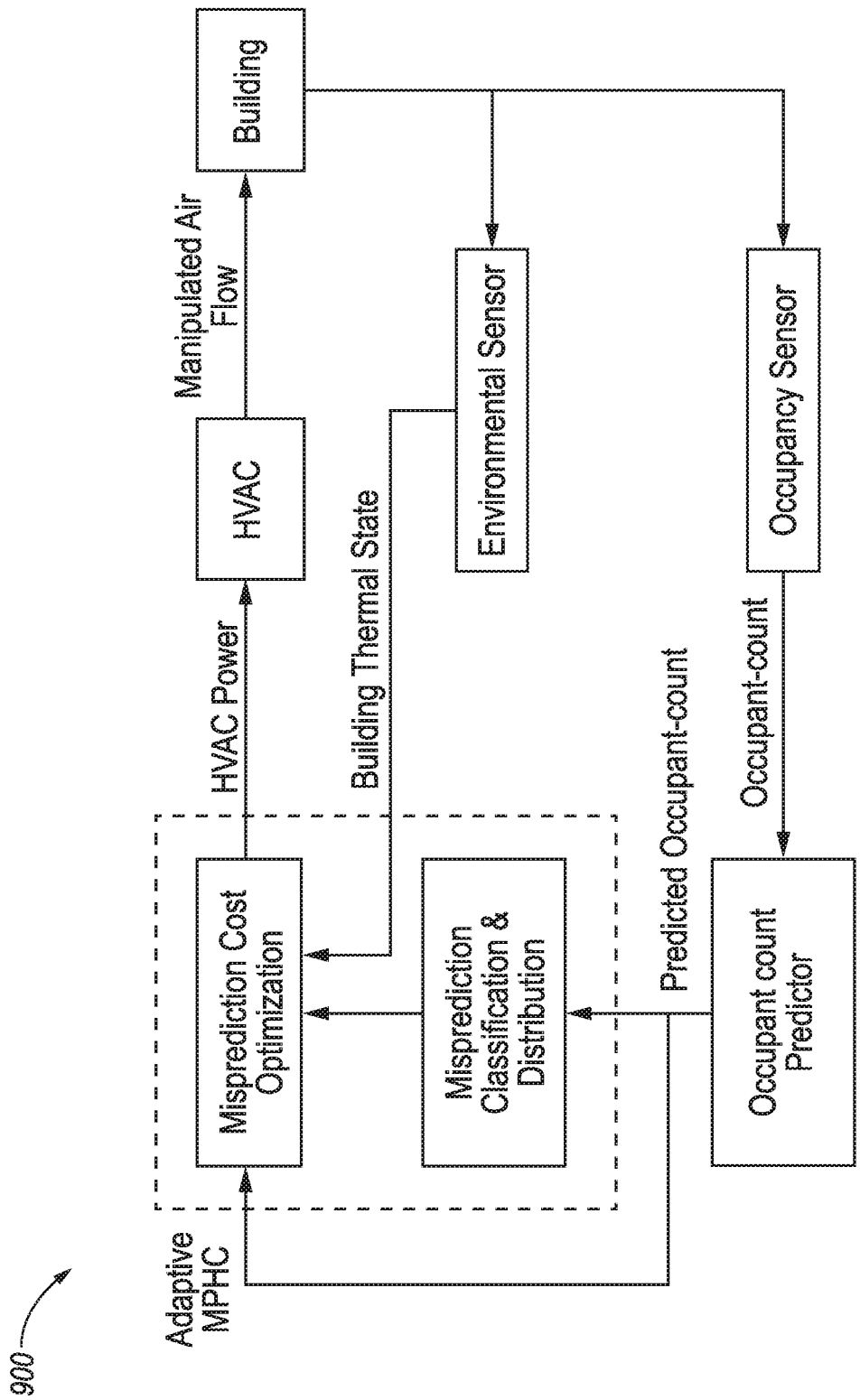
FIG. 9 illustrates an example adaptive model predictive HVAC control architecture.

FIG. 9 illustrates an example adaptive model predictive HVAC control architecture. To make the control decisions of the HVAC controller 106 more robust to the random misprediction, the HVAC controller 106 may adopt such an architecture to adapt to the misprediction type distribution and corresponding misprediction cost in the different time slot.

The control diagram is shown as a closed control loop. As shown, the HVAC controller 106 determines the HVAC power, which further changes the temperature of manipulated airflow and building thermal states. The occupancy sensors 108 sense the occupant events and calculate the actual occupant count, which is used to predict the future number of occupants by the predictor 112. Environmental sensors of the building 102 detect and output the real-time building thermal state. This information from occupant-count predictor 112 and environmental sensors of the building 102 is forwarded to the HVAC controller 106 as feedback to improve control efficiency. In particular, for one upcoming time slot the HVAC controller 106 generates a misprediction type distribution by sampling the historical prediction and true occupant-count information. Based on the misprediction type distribution and predicted occupant-count information for a given time slot, the HVAC controller 106 determines the HVAC power by minimizing the misprediction cost expectation.

Regarding misprediction classification and distribution, the misprediction type distribution may be updated in the different time slots of the day based on the real-time collected prediction and actual occupant-count data. For the upcoming N time slots, the historical prediction and true occupancy status data are sampled at the same time of day and the frequency of different types of misprediction are counted. Let $p_i^{tn}(k)$, $p_i^{fp}(k)$, $p_i^{fn}(k)$ and $p_i^{tp}(k)$ be the probability that the misprediction types true negative, false positive, false negative and true positive exist in zone i for time slot k, respectively. The distribution of these four types of misprediction may be forwarded to the misprediction cost optimization part.

Notably, the HVAC controller 106 calculating $P(\overline{Occ}(t))$ may be sensitive to the misprediction when there is a large probability of false positive/negative misprediction due to the incorrect weight between two objectives. Hence, the misprediction cost optimization part aims at determining the HVAC power to minimize the misprediction cost expectation based on the probability of predicting the occupancy status correctly or incorrectly for a given predicted status.

Recalling that the model predictive HVAC control objective with true occupant-count $Occ_i(k)$ for zone i in time slot k is defined as:

$$J_i(k) = |u_i(k)| + \beta Occ_i(k)|PMV_i(k)|$$

Significantly, at the beginning of time slot k, the computation only has the predicted occupant-count for future N time slots and n zones.

Let $\widehat{u}_i(k)$ and $\widehat{PMV}_i(k)$ be the energy consumption and PMV when using $\overline{Occ}_i(k)$ to solve equation (1) for zone i and time slot k. Here, the control objective value with $\widehat{u}_i(k)$ and $\overline{Occ}_i(k)$ is defined as $$\widehat{J}_i(k) = |\widehat{u}_i(k)| + \beta Occ_i(k)|\widehat{PMV}_i(k)|$$

Then the misprediction cost may be defined as $\Delta J_i(k) = \widehat{J}_i(k) - J_i(k)$.

The misprediction cost expectation for zone i and region k may be defined as:

$$E(\Delta J_i(k)) = \frac{p_i^{fp}(k)\Delta J_i^{fp}(k)}{p_i^{fp}(k) + p_i^{tp}(k)} + \frac{p_i^{tp}(k)\Delta J_i^{tp}(k)}{p_i^{fp}(k) + p_i^{tp}(k)} \quad (2)$$

$$\text{or} = \frac{p_i^{tn}(k)\Delta J_i^{tn}(k)}{p_i^{tn}(k) + p_i^{fn}(k)} + \frac{p_i^{fn}(k)\Delta J_i^{fn}(k)}{p_i^{tn}(k) + p_i^{fn}(k)}$$

According to the predicted occupancy status information, these different mathematical equations of misprediction cost expectation may be defined. $\Delta J_i^{fp}(k)$, $\Delta J_i^{fn}(k)$, $\Delta J_i^{tp}(k)$, and $\Delta J_i^{tn}(k)$ may refer the misprediction cost of the corresponding different types of misprediction (false positive, false negative, true positive, and true negative, respectively). These may be calculated as described herein.

As shown in Table 1, for both true negative and false positive misprediction, there is no occupant in the zone, so the misprediction cost should be the wasted energy, which may be represented as:

$$\Delta J_i^{tn}(k) = |\hat{u}_i(k)|, \Delta J_i^{fp}(k) = |\hat{u}_i(k)| \quad (3)$$

For the true positive prediction, the objective value determined by a control decision $\hat{u}_i(k)$ is $\tilde{f}_i(k) = |\hat{u}_i(k)| + \beta \overline{Occ_i}(k) |\overline{PMV_i}(k)|$, where the predicted value $\overline{Occ_i}(k)$ is used as the actual value since the predictor makes true positive prediction. If the occupancy status is correctly predicted as occupied, the optimal HVAC power in zone i during time slot k is also influenced by the other nN−1 decision variables. Therefore, the optimal objective value of zone i and time slot k may be defined with true positive prediction as the expected optimal objective value with $2^{nN-1}$ possible cases. For case $1 \leq j \leq 2^{nN-1}$, let $P_j$ be the probability that this case exists. Given the case with certain correct or incorrect prediction information, the problem formulation may be determined, and the optimal objective value may be calculated, denoted by $J_{i,j}(k)$. This leads to $J_i^{tp}(k) = \sum_{j=1}^{nN-1} P_j J_{i,j}(k|I_i(k) = \text{true positive})$, where $I_i(k)$ is one indicator function to show the misprediction type. The misprediction cost may be defined as:

$$\Delta J_i^{tp}(k) = |\hat{u}_i(k)| + \beta \overline{Occ_i}(k) |\overline{PMV_i}(k)| - \sum_{j=1}^{nN-1} P_j J_{i,j}(k|I_i(k) = \text{true positive}) \quad (4)$$

In the above function, $J_i^{tp}(k)$ is one pre-computed constant value for given prediction and misprediction distribution of n zones and N time slots and $\overline{PMV_i}(k)$ is also one linear function related to $\hat{u}_i(k)$. Therefore, $\Delta J_i^{tp}(k)$ is one linear function of $\hat{u}_i(k)$.

For false negative prediction, $\tilde{f}_i(k) = |\hat{u}_i(k)| + \beta |\overline{PMV_i}(k)|$, where Occi(k)=1 is used since the predictor infers the status as unoccupied. The optimal objective value of time slot k and zone i, denoted as $J_i^{fn}(k)$, is also one expected optimal objective value. This equation may be defined as:

$$\Delta J_i^{fn}(k) = |\hat{u}_i(k)| + \beta |\overline{PMV_i}(k)| - \sum_{j=1}^{2^{nN-1}} P_j J_{i,j}(k|I_i(k) = \text{false negative}) \quad (5)$$

This equation (5) is also a linear equation related to HVAC power $\hat{u}_i(k)$, $1 \leq i \leq n$, $1 \leq k \leq N$.

The total misprediction cost expectation may be minimized over N time slots and n zones, defined as $\sum_{i=1}^{n} \sum_{k=t}^{t+N-1} E(\Delta J_i(k))$. According to Equation (2), $E(\Delta J_i(k))$ is linear to $\Delta J_i^{fp}(k)$ and $\Delta J_i^{tp}(k)$ or $\Delta J_i^{tn}(k)$ and $\Delta J_i^{fn}(k)$. Based on the previous definition of these four variables, they are linear to the control decision variables $\hat{u}_i(k)$. Therefore, the objective function is linear to HVAC power $\hat{u}_i(k)$. The problem of determining the HVAC power to minimize the total misprediction cost may thus be formulated as follows:

$$\min_{\hat{u}(k), \hat{x}(k)} \sum_{k=t}^{t+N-1} \sum_{i=1}^{n} E(\Delta J_i(k)) \quad (2) \sim (5) \ (6)$$

$$\text{s.t. } \hat{x}(k+1) = A\hat{x}(k) + B_u \hat{u}(k) + B_d \hat{d}(k)$$
$$\hat{y}(k) = C\hat{x}(k)$$
$$\underline{U_i} \leq u_i(k) \leq \overline{U_i}$$

Since the objective function of the total misprediction cost minimization problem is linear to the decision variables, and as all the constraints are also linear, equation (6) is convex and can be solved using a convex optimizer.

The pseudo-code of the adaptive model predictive HVAC controller 106 algorithm is shown in Algorithm 1. At the beginning of each time slot t, the building thermal state is updated and the occupant-count is predicted for the future N time slots in n zones. Then, the misprediction classification and distribution part updates the probability of the different types of misprediction for N time slots and n zones. According to the predicted occupant-count and misprediction type distribution, the objective of minimizing the total misprediction cost expectation is updated. The equation (6) may then be solved to determine the optimal HVAC power, which is robust to the random misprediction.

---

Algorithm 1: Adaptive model predictive HVAC controller real-time HVAC power control

---

Input: Time horizon N time slots; number of zones n; weight decided by building managers to balance two objectives β.
Output: Control decision: $u_i(k)$, $1 \leq i \leq n$, $t \leq k \leq t + N - 1$
1. while At the beginning of every time slot t, denoted as t-th time slot do
   2. Update the initial building thermal state x(t − 1);
   3. Update the predicted occupant counts in the upcoming N time slots of n zones, denoted as $\overline{Occ}(t)$;
   4. Update the misprediction type distribution $p_i^{tn}(k)$, $p_i^{fp}(k)$, $p_i^{fn}(k)$ and $p_i^{tp}(k)$ for the future N time slots and n zones.
   5. According to predicted occupant-count $\overline{Occ_i}(k)$ and misprediction type distribution, update the total misprediction cost expectation $\Sigma_{i,k} E(\Delta J_i(k))$ according to equation (2).
   6. Solve equation(6) to determine the HVAC power $\hat{u}_i(k)$ for $1 \leq i \leq n$ and $t \leq k \leq t + N - 1$.
7. end while
8. return HVAC power decisions

---

Based on the empirical performance analysis of predictors and control using the HVAC controller 106, during the time slots with small misprediction probability, the occupancy-aware control shows very close performance compared with using true occupant count. However, for time slots with large misprediction probability, due to the small true number of occupants, it is hard to estimate the occupancy status with high accuracy. Here, the probability-based adaptive HVAC controller 106 approach essentially offers a probabilistic guarantee that if $\in$ percentage of all misprediction type data follows the sampled misprediction type distribution, our solution can minimize the total misprediction cost of $\in$ percentages of future time slots. According to the law of large numbers, with long-term occupancy data, the e percentage of time slots' mispredictions gets close to the true distribution. Therefore, this approach can minimize the misprediction cost expectation over time.

Figure 10:
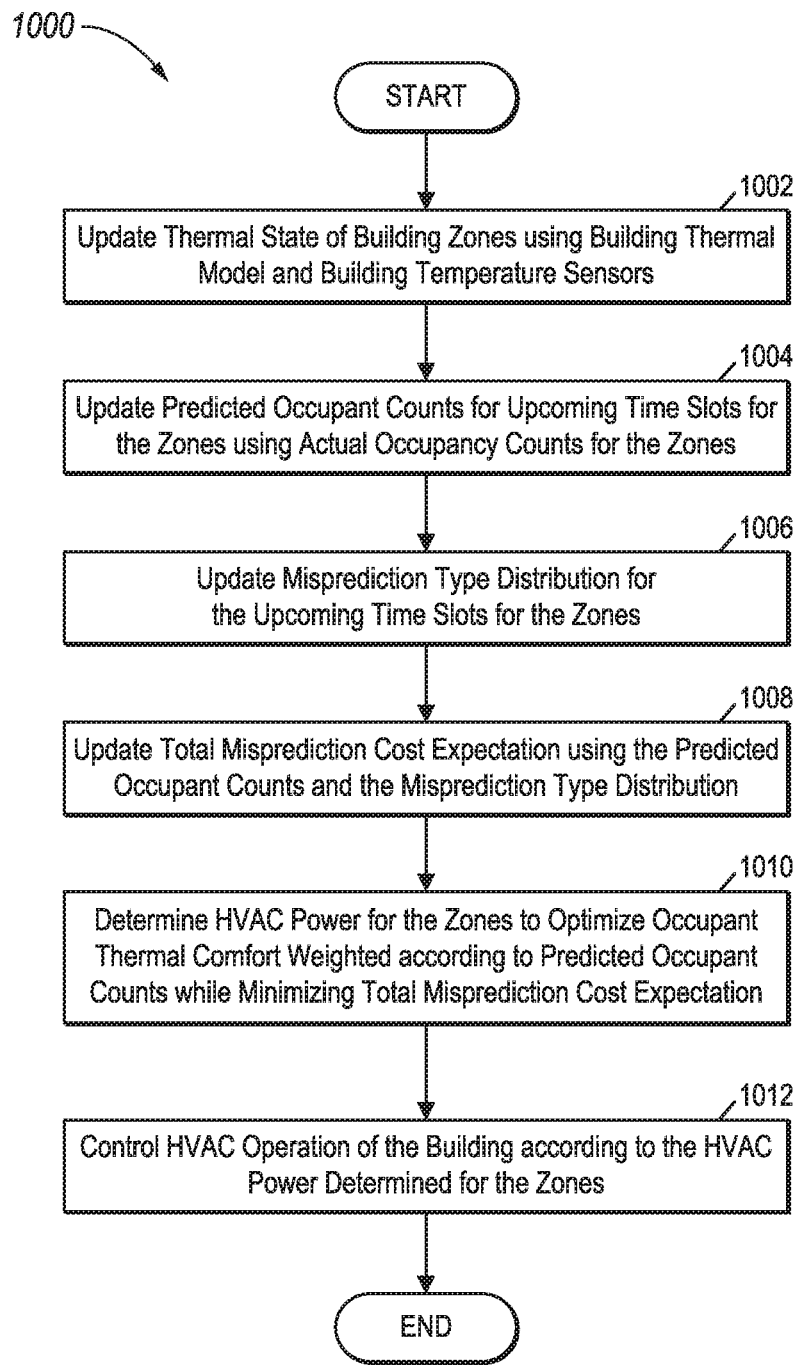
FIG. 10 illustrates an example process for controlling HVAC operation of a building to minimize energy consumption using predicted occupant-counts and accounting for misprediction cost.

FIG. 10 illustrates an example process 1000 for controlling HVAC operation of a building 102 to minimize energy consumption using predicted occupant-counts and accounting for misprediction cost. In an example, the process 1000 may be performed by the operation of the HVAC controller 106 as discussed in detail herein.

At operation 1002, the HVAC controller 106 updates a thermal state of a plurality of zones of the building 102 according to a building thermal model 110 and information received from temperature sensors of the building 102. In an example, the building thermal model 110 is a dynamic model that describes how the building thermal state changes based on building-internal and building-external temperature disturbances during the plurality of time slots and the heat exchange configuration of the plurality of zones of the building 102.

At operation 1004, the HVAC controller 106 updates predicted occupant counts for an upcoming plurality of time slots for each of the plurality of zones using actual occupancy counts for each of the plurality of zones. In an example, the HVAC controller 106 may determine the current occupancy counts using occupancy sensors 108 near each doorway of the building, such that real-time depth frames from the occupancy sensors 108 are provided to that estimates occupancy counts for the zones responsive to occupants entering or exiting through the doorways. The predicted occupant counts may be modeled using a predictor 112 that includes one or more of a time-inhomogeneous Markov Chain, where each state represents an occupant count, a transition between states refers to occupancy change temporally, and a probability distribution of a next state depends on a current state and a current time; a linear regression model using a regression function to predict a next occupancy count from a current occupancy count; or a recurrent neural network that combines temporal and contextual features to predict the next occupancy count from the current occupancy count.

At operation 1006, the HVAC controller 106 updates a misprediction type distribution for the upcoming plurality of time slots for each of the plurality of zones, the misprediction type distribution indicating misprediction for true negatives, false positives, false negatives, and true positives. For instance, the misprediction type distribution may be updated for a plurality of time slots for each of the plurality of zones based on the predicted occupant counts and actual occupancy counts for the plurality of time slots as later measured.

At operation 1008, the HVAC controller 106 updates a total misprediction cost expectation according to the predicted occupant counts and the misprediction type distribution. In an example, the misprediction cost expectation is updated for the plurality of time slots for each of the plurality of zones using a set of linear equations related to the HVAC power for each of true negatives, false positives, false negatives, and true positives.

At operation 1010, the HVAC controller 106 determines HVAC power for each of the plurality of zones to optimize occupant thermal comfort weighted according to the predicted occupant counts while minimizing the total misprediction cost expectation. This determination may be constrained to factors such as the heat exchange configuration of the building 102 and minimum and maximum HVAC power available to each of the plurality of zones.

At operation 1012, the HVAC controller 106 controls HVAC operation of the building 102 according to the HVAC power determined for each of the plurality of zones. After operation 1012, the process 1000 ends. It should be noted, however, that the process 1000 is iterative and some or all of the described operations of the process 1000 may be performed simultaneously, and/or may repeat in a loop-wise iterative manner to control operation of the HVAC system over time.

Thus, the real-time occupant count received from the occupancy sensors 108 and the predicted future occupant count in each zone of the building 102 determined using the predictive model 112 are useful for providing efficient HVAC control. In one aspect, accurate binary occupancy status, e.g., occupied or not, informs the HVAC controller 106 to determine when to turn on or off the building HVAC 104. In another aspect, due to the heat emissions of the occupants themselves, the HVAC controller 106 may utilize the occupant counts to save energy and perform precise heating and cooling accordingly. In this framework, occupancy sensors 108 may collect the real-time occupant counts of different zones of the building 102, where this dataset may be used to design the predictive model 112 and create a predictive HVAC controller 106.

For the model predictive control (MPC) based HVAC controller 106, one MPC-based optimization problem is solved to determine the HVAC power for the future time slots. The MPC controller 106 discretizes the timeline into multiple time slots and considers the power control for future N time slots at the beginning of time slot t. One time slot may be indexed by k, (k=t, . . . , t+N−1). It may be assumed for modeling that there are n zones in one building 102 and that u(k) refers to length n column vector to describe control input, e.g., heating/cooling power during time slot k for n zones.

Figure 11:
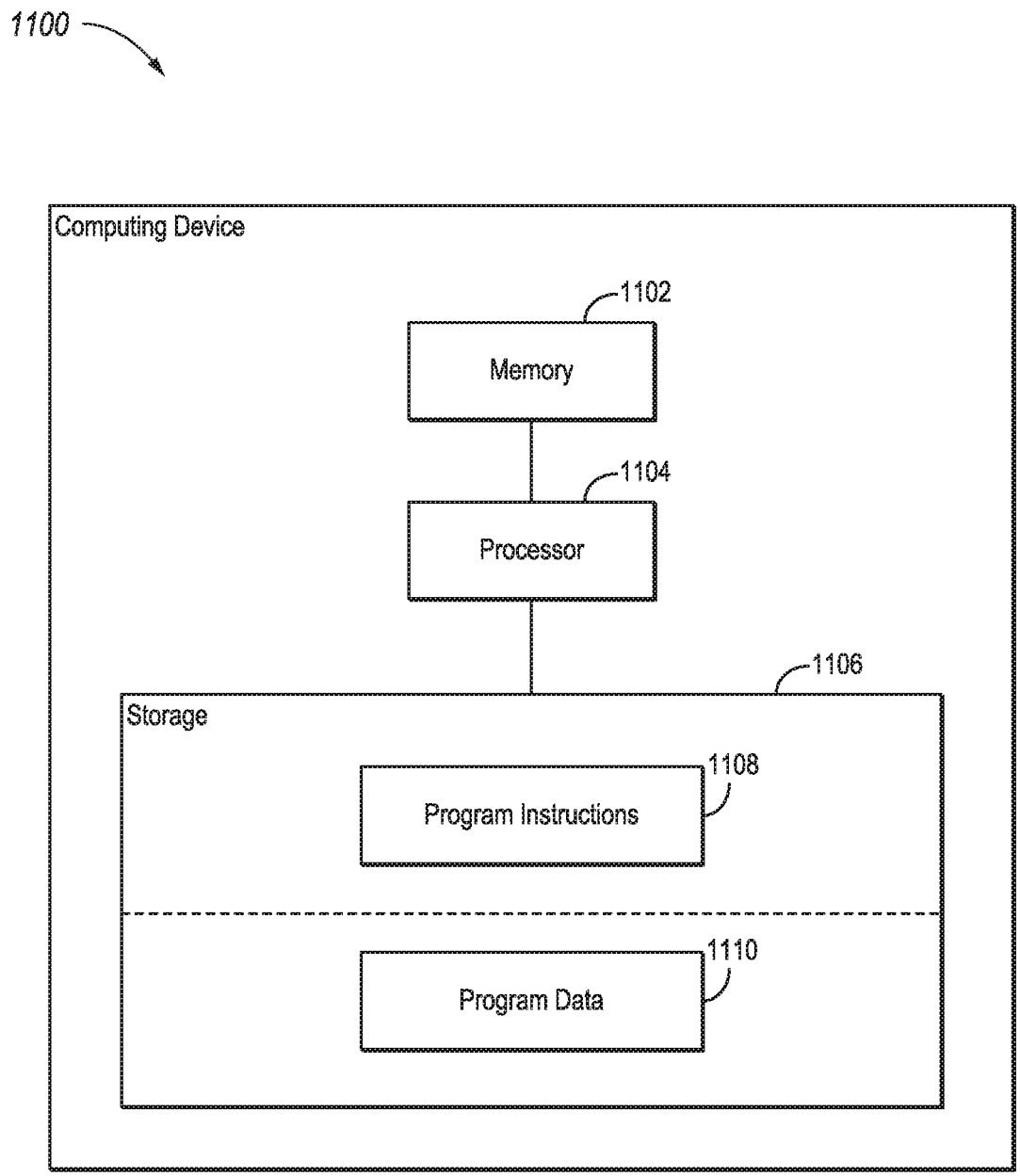
FIG. 11 illustrates an example computing device for performing aspects of the HVAC operation described in detail herein.

FIG. 11 illustrates an example computing device 1100 for performing aspects of the HVAC operation described in detail herein. The algorithms and/or methodologies of components of the system 100, such as the HVAC controller 106, may be implemented using such a computing device 1100. The computing device 1100 may include memory 1102, processor 1104, and non-volatile storage 1106. The processor 1104 may include one or more devices selected from high-performance computing (HPC) systems including high-performance cores, microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on computer-executable instructions residing in memory 1102. The memory 1102 may include a single memory device or a number of memory devices including, but not limited to, random access memory (RAM), volatile memory, non-volatile memory, static random-access memory (SRAM), dynamic random access memory (DRAM), flash memory, cache memory, or any other device capable of storing information. The non-volatile storage 1106 may include one or more persistent data storage devices such as a hard drive, optical drive, tape drive, non-volatile solid-state device, cloud storage or any other device capable of persistently storing information.

The processor 1104 may be configured to read into memory 1102 and execute computer-executable instructions residing in program instructions 1108 of the non-volatile storage 1106 and embodying algorithms and/or methodologies of one or more embodiments. The program instructions 1108 may include operating systems and applications. The program instructions 1108 may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

Upon execution by the processor 1104, the computer-executable instructions of the program instructions 1108 may cause the computing device 1100 to implement one or more of the algorithms and/or methodologies disclosed herein. The non-volatile storage 1106 may also include data 1110 supporting the functions, features, and processes of the one or more embodiments described herein.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A method for controlling heating, ventilation, and air conditioning (HVAC) operation of a building to minimize energy consumption using predicted occupant-counts and accounting for misprediction cost, comprising:
    updating a thermal state of a plurality of zones of the building according to a building thermal model and information received from temperature sensors of the building;
    updating predicted occupant counts for an upcoming plurality of time slots for each of the plurality of zones using actual occupancy counts for each of the plurality of zones;
    updating a misprediction type distribution for the upcoming plurality of time slots for each of the plurality of zones, the misprediction type distribution indicating misprediction for true negatives, false positives, false negatives, and true positives;
    updating a total misprediction cost expectation according to the predicted occupant counts and the misprediction type distribution;
    determining HVAC power for each of the plurality of zones to optimize occupant thermal comfort weighted according to the predicted occupant counts while minimizing the total misprediction cost expectation, the determining being constrained to a heat exchange configuration of the building and minimum and maximum HVAC power available to each of the plurality of zones; and
    controlling HVAC operation of the building according to the HVAC power determined for each of the plurality of zones.

2. The method of claim 1, wherein the building thermal model is a dynamic model that describes how the building thermal state changes based on building-internal and building-external temperature disturbances during the plurality of time slots and the heat exchange configuration of the plurality of zones of the building.

3. The method of claim 1, further comprising determining the actual occupancy counts using occupancy sensors near each doorway of the building.

4. The method of claim 1, further comprising modeling the predicted occupant counts using one or more of:
    a time-inhomogeneous Markov Chain, where each state represents an occupant count, a transition between states refers to occupancy change temporally, and a probability distribution of a next state depends on a current state and a current time;
    a linear regression model using a regression function to predict a next occupancy count from a current occupancy count; or
    a recurrent neural network that combines temporal and contextual features to predict the next occupancy count from the current occupancy count.

5. The method of claim 1, further comprising updating the misprediction type distribution for the plurality of time slots for each of the plurality of zones based on the predicted occupant counts and actual occupancy counts for the plurality of time slots as later measured.

6. The method of claim 1, further comprising updating the misprediction cost expectation for the plurality of time slots for each of the plurality of zones using a set of linear equations related to the HVAC power for each of true negatives, false positives, false negatives, and true positives.

7. A system for controlling heating, ventilation, and air conditioning (HVAC) operation of a building to minimize energy consumption using predicted occupant-counts and accounting for misprediction cost, comprising:
    an HVAC controller programmed to:
        update a thermal state of a plurality of zones of the building according to a building thermal model and information received from temperature sensors of the building;
        update predicted occupant counts for an upcoming plurality of time slots for each of the plurality of zones using actual occupancy counts for each of the plurality of zones;
        update a misprediction type distribution for the upcoming plurality of time slots for each of the plurality of zones, the misprediction type distribution indicating misprediction for true negatives, false positives, false negatives, and true positives;
        update a total misprediction cost expectation according to the predicted occupant counts and the misprediction type distribution;
        determine HVAC power for each of the plurality of zones to optimize occupant thermal comfort weighted according to the predicted occupant counts while minimizing the total misprediction cost expectation, the determining being constrained to a heat exchange configuration of the building and minimum and maximum HVAC power available to each of the plurality of zones; and
        control HVAC operation of the building according to the HVAC power determined for each of the plurality of zones.

8. The system of claim 7, wherein the building thermal model is a dynamic model that describes how the building thermal state changes based on building-internal and building-external temperature disturbances during the plurality of time slots and the heat exchange configuration of the plurality of zones of the building.

9. The system of claim 7, wherein the HVAC controller is further programmed to determine the actual occupancy counts using occupancy sensors near each doorway of the building.

10. The system of claim 7, wherein the HVAC controller is further programmed to model the predicted occupant counts using one or more of:
- a time-inhomogeneous Markov Chain, where each state represents an occupant count, a transition between states refers to occupancy change temporally, and a probability distribution of a next state depends on a current state and a current time;
- a linear regression model using a regression function to predict a next occupancy count from a current occupancy count; or
- a recurrent neural network that combines temporal and contextual features to predict the next occupancy count from the current occupancy count.

11. The system of claim 7, wherein the HVAC controller is further programmed to update the misprediction type distribution for the plurality of time slots for each of the plurality of zones based on the predicted occupant counts and actual occupancy counts for the plurality of time slots as later measured.

12. The system of claim 7, wherein the HVAC controller is further programmed to update the misprediction cost expectation for the plurality of time slots for each of the plurality of zones using a set of linear equations related to the HVAC power for each of true negatives, false positives, false negatives, and true positives.

13. A non-transitory computer readable medium comprising instructions for controlling heating, ventilation, and air conditioning (HVAC) operation of a building to minimize energy consumption using predicted occupant-counts and accounting for misprediction cost, that, when executed by an HVAC controller, cause the HVAC controller to:
- update a thermal state of a plurality of zones of the building according to a building thermal model and information received from temperature sensors of the building;
- update predicted occupant counts for an upcoming plurality of time slots for each of the plurality of zones using actual occupancy counts for each of the plurality of zones;
- update a misprediction type distribution for the upcoming plurality of time slots for each of the plurality of zones, the misprediction type distribution indicating misprediction for true negatives, false positives, false negatives, and true positives;
- update a total misprediction cost expectation according to the predicted occupant counts and the misprediction type distribution;
- determine HVAC power for each of the plurality of zones to optimize occupant thermal comfort weighted according to the predicted occupant counts while minimizing the total misprediction cost expectation, the determining being constrained to a heat exchange configuration of the building and minimum and maximum HVAC power available to each of the plurality of zones; and
- control HVAC operation of the building according to the HVAC power determined for each of the plurality of zones.

14. The medium of claim 13, wherein the building thermal model is a dynamic model that describes how the building thermal state changes based on building-internal and building-external temperature disturbances during the plurality of time slots and the heat exchange configuration of the plurality of zones of the building.

15. The medium of claim 13, further comprising instructions that, when executed by the HVAC controller, cause the HVAC controller to determine the actual occupancy counts using occupancy sensors near each doorway of the building.

16. The medium of claim 13, further comprising instructions that, when executed by the HVAC controller, cause the HVAC controller to model the predicted occupant counts using one or more of:
- a time-inhomogeneous Markov Chain, where each state represents an occupant count, a transition between states refers to occupancy change temporally, and a probability distribution of a next state depends on a current state and a current time;
- a linear regression model using a regression function to predict a next occupancy count from a current occupancy count; or
- a recurrent neural network that combines temporal and contextual features to predict the next occupancy count from the current occupancy count.

17. The medium of claim 13, further comprising instructions that, when executed by the HVAC controller, cause the HVAC controller to update the misprediction type distribution for the plurality of time slots for each of the plurality of zones based on the predicted occupant counts and actual occupancy counts for the plurality of time slots as later measured.

18. The medium of claim 13, further comprising instructions that, when executed by the HVAC controller, cause the HVAC controller to update the misprediction cost expectation for the plurality of time slots for each of the plurality of zones using a set of linear equations related to the HVAC power for each of true negatives, false positives, false negatives, and true positives.

* * * * *